(12) United States Patent
Schick et al.

(10) Patent No.: US 7,555,887 B2
(45) Date of Patent: Jul. 7, 2009

(54) MOWER DECK ENHANCEMENT

(75) Inventors: Scott A. Schick, Corydon, IA (US); Stephen C. Thatcher, Humeston, IA (US)

(73) Assignee: Shivvers Group Incorporated, Corydon, IA (US)

( * ) Notice: Subject to any disclaimer, the term of this patent is extended or adjusted under 35 U.S.C. 154(b) by 0 days.

(21) Appl. No.: 11/832,348

(22) Filed: Aug. 1, 2007

(65) Prior Publication Data

US 2009/0031688 A1 Feb. 5, 2009

(51) Int. Cl.
*A01D 67/00* (2006.01)

(52) U.S. Cl. .................. 56/320.2; 56/320.1

(58) Field of Classification Search .............. 56/13.6, 56/17.4, 320.1, 320.2, DIG. 22, DIG. 24, 56/6, 13.5, 14.7, 16.9, DIG. 5
See application file for complete search history.

(56) References Cited

U.S. PATENT DOCUMENTS

| | | | | |
|---|---|---|---|---|
| 3,234,719 A * | 2/1966 | Rank | .................. | 56/13.6 |
| 4,099,366 A * | 7/1978 | Peterson | .................. | 56/13.6 |
| 4,364,221 A * | 12/1982 | Wixom | .................. | 56/13.6 |
| 5,205,112 A * | 4/1993 | Tillotson et al. | .................. | 56/2 |
| 5,457,947 A * | 10/1995 | Samejima et al. | .................. | 56/16.7 |
| 5,845,475 A | 12/1998 | Busboom et al. | | |
| 5,894,717 A * | 4/1999 | Yamashita et al. | .................. | 56/320.1 |
| 5,987,863 A | 11/1999 | Busboom et al. | | |
| 6,038,840 A * | 3/2000 | Ishimori et al. | .................. | 56/13.3 |
| 6,065,276 A * | 5/2000 | Hohnl et al. | .................. | 56/320.1 |
| 6,148,595 A * | 11/2000 | Rabe et al. | .................. | 56/320.2 |
| 6,185,920 B1 * | 2/2001 | Oxley | .................. | 56/14.7 |
| 6,189,307 B1 * | 2/2001 | Buss et al. | .................. | 56/320.1 |
| 6,609,358 B1 * | 8/2003 | Schmidt et al. | .................. | 56/320.2 |
| 6,681,553 B2 * | 1/2004 | Ferree et al. | .................. | 56/320.1 |
| 7,204,073 B1 * | 4/2007 | Chenevert | .................. | 56/320.2 |
| 7,299,613 B2 * | 11/2007 | Samejima et al. | .................. | 56/320.1 |
| 2001/0002534 A1 * | 6/2001 | Oxley | .................. | 56/320.2 |
| 2004/0237492 A1 * | 12/2004 | Samejima et al. | .................. | 56/320.1 |
| 2005/0028507 A1 * | 2/2005 | Osborne et al. | .................. | 56/320.2 |
| 2006/0230735 A1 * | 10/2006 | Samejima et al. | .................. | 56/320.2 |
| 2006/0248869 A1 * | 11/2006 | Chenevert et al. | .................. | 56/320.1 |
| 2007/0068133 A1 * | 3/2007 | Kure et al. | .................. | 56/320.1 |
| 2007/0261380 A1 * | 11/2007 | Bledsoe | .................. | 56/320.2 |
| 2008/0047249 A1 * | 2/2008 | Davis et al. | .................. | 56/320.2 |

\* cited by examiner

*Primary Examiner*—Thomas B Will
*Assistant Examiner*—Joan D Misa
(74) *Attorney, Agent, or Firm*—McKee, Voorhees & Sease, P.L.C.

(57) ABSTRACT

A multiblade lawn mower has a mower deck with a downwardly directed interior opening. At least two rotary blades are disposed within the opening. A generally circular wraparound baffle is adapted to surround each rotary blade. The wraparound baffle has a throat area opening generally towards one of the walls at an acute angle and/or an opening in the mower deck. The wraparound baffle also has a sloped wall portion adapted to decrease in height gradually from the height of the wraparound baffle to an edge terminating in the throat area. A collar is attached to the top wall and extends downward to a position adjacent the rotary blade. The collar surrounds a spindle attached to the rotary blade to prevent grass buildup created by movement of the rotary blades in a vortex area proximate the spindle.

13 Claims, 4 Drawing Sheets

MOWER DECK ENHANCEMENT

FIELD OF THE INVENTION

The present invention relates to a new mower deck enhancement and more particularly a mower deck enhancement having a wraparound baffle for each blade with a sloped wall portion terminating in the throat area for discharge operation and a mulching baffle positioned in the throat area to fully enclose the wraparound baffle for mulching operation.

BACKGROUND OF THE INVENTION

Traditionally, mower decks consist of front and rear baffles designed to create a smooth flow of grass cuttings suspended in air flow streams created by the blades within the mower housing, through the throat area and out the discharge. Arguably, these designs still suffer from the undesirable problems of buildup, clumping, and clogging of grass clippings within the mower housing. Mower housings are predisposed to these problems in large part as a result of stalled or non-unidirectional air flow streams within the mower housing and air turbulence generated at blade intersection points. Therefore, there is a need for a mower deck having separate wraparound baffles for each blade adapted to generate unidirectional air flow streams for efficiently discharging grass clippings and to prevent turbulence at blade intersection points.

A full wraparound baffle would prevent turbulence at blade intersection points and where air flow streams traveling in counter directions between the various sets of blades collide to disrupt the overall suspension and discharge of clippings, but would not allow discharge of grass clippings from the mower deck. Therefore, there is a need to provide a wraparound baffle having a sloped wall portion that decreases in height from the height of the wraparound baffle and terminates in the throat area to facilitate discharge of grass clippings, prevent turbulence from being generated at blade tip intersection points and prohibit conflicting air stream flows between and around the blades, within the baffles and/or through the throat and out the discharge opening.

Traditional mower decks also have a spindle extending through the top wall of the mower deck which is attached to the blade for the purpose of imparting rotation to the blade. The space proximate the spindle, between the blade and top wall, is predisposed to vortices, stalling and disruption of air flow streams, which causes grass clipping buildup. Stalled air streams around the spindle contribute to airflow boundary problems between the stalled air streams near the spindle and more fluid air streams farther away from the spindle. Therefore, there is a need to provide a collar around the spindle attached to the blade to occupy the area proximate the spindle being predisposed to high turbulence, vortices and stalled air streams to prevent clogging, buildup and air flow interruptions around the spindle.

Over time, mower decks have been designed with versatility in mind by providing decks and blade designs that could operate in a side discharge mode or mulching mode. Although these mowers allow the user to quickly switch between side discharge and mulching, the baffles used to complete the conversion fail to optimize the full potential of both modes and in fact, often hinder the performance and intended operation of one or both of these modes due to inadequate considerations given to turbulence issues, such as air flow conflicts between blades, at blade intersection points or around the blade/spindle. Therefore, there is a need to provide a removable mulching baffle for closing off the opening in the wraparound baffle which can be quickly removed and reattached to convert the deck between discharge and mulching configurations. There is a further need to provide a mulching configuration that exhibits increased suction, better cutting, enhanced mulching, better suspension of grass clippings, and limited turbulence between blades, at blade intersection points or around the blade/spindle.

BRIEF SUMMARY OF THE INVENTION

Therefore it is a primary object, feature, or advantage of the present invention to improve over the state of the art.

It is a further object, feature, or advantage of the present invention to provide a mower deck enhancement operating in the discharge mode wherein each blade has a wraparound baffle with a sloped wall portion terminating in the throat to enhance grass clipping flow within the baffle, throat and discharge area by preventing turbulence between blade intersection points, between and around the blades/spindles, through the throat area, and out the discharge.

Yet another object, feature, or advantage of the present invention is to provide a mower deck enhancement in the mulching operation wherein a mulching baffle may be inserted in an opening in the wraparound baffle to close off the throat area to create a full wraparound baffle around each blade to reduce the air turbulence at blade intersection points, increase the suction and overall cutting effectiveness of the blades, and reduce grass clipping volumes being transferred from one blade to any one of the other blades.

A further object, feature, or advantage of the present invention is to provide a mower deck enhancement wherein a collar is positioned around the spindle attached to the blade to prevent air flows within the baffle from stalling, creating turbulence or vortices approximate the spindle resulting in less buildup, clogging, air flow conflicts between stalled air proximate the spindle, and more transient air flows away from the spindle to encourage smooth, linear flows of grass clippings around the collar.

Yet another object, feature, or advantage of the present invention is to provide a mower deck enhancement wherein air flow streams resulting from individual blades are kept separate from each other until exiting the baffle into the throat and discharge areas of the mower deck where unidirectional air flow streams generate a high throughput out of the throat and discharge areas of the mower deck.

One or more of these and/or other objects, features, or advantages of the present invention will become apparent from the specification and claims that follow.

According to one aspect of the present invention, a multi-blade lawn mower is disclosed. The multiblade lawnmower includes a mower deck having a top wall, a front wall, a back wall, and at least one side wall defining a downwardly directed interior opening, at least two rotary blades disposed within the downwardly directed interior opening, at least one opening in the downwardly directed interior opening adapted to discharge cut grass from the mower deck, a generally circular wraparound baffle adapted to surround each rotary blade and form a cutting chamber, wherein each generally circular wraparound baffle has a throat area adapted to direct air flow in a common direction, and a power source operatively connected to the rotary blades to impart rotation to each of the rotary blades.

A further aspect of the present invention involves the generally circular wraparound baffle being further adapted to discharge cut grass generally toward the at least one opening and/or any wall at an acute angle.

A further aspect of the present invention involves each generally circular wraparound baffle having a sloped wall portion with an arcuate shape, wherein the sloped wall portion is adapted to decrease in height gradually from the height of the generally circular wraparound baffle to an edge terminating on the top wall in the throat area to meter cut grass back into the turf and keep cut grass from recycling in the cutting chamber.

A further aspect of the present invention involves the sloped wall portion further comprising a curved wall portion having an arcuate shape, wherein the curved wall portion is adapted to curve inward toward the rotary blade away from the generally circular wraparound baffle to meter cut grass back into the turf and keep cut grass from recycling in the cutting chamber.

A further aspect of the present invention involves a collar attached to the top wall extending downward to a position adjacent the rotary blade being adapted to surround a spindle attached to the rotary blade to prevent grass buildup created by movement of the rotary blade in a vortex area proximate the spindle.

A further aspect of the present invention involves a removable baffle being adapted to close off the throat area associated with each generally circular wraparound baffle to mulch cut grass.

A further aspect of the present invention involves a mulching plate being removably attached to the opening in the downwardly directed interior opening.

A further aspect of the present invention involves the generally circular wraparound baffle preventing turbulence at blade intersection points, keeping air streams around one blade from disrupting air streams around another blade and keeping air streams within the mower deck pushing in the same direction.

In another aspect of the present invention, a multiblade lawn mower is disclosed. The multiblade lawn mower includes a mower deck having a top wall, a front wall, a back wall, and at least one side wall defining a downwardly directed interior opening, at least two blades disposed within the downwardly directed interior opening, wherein each blade is attached to a spindle, a power source operatively connected to the spindle to impart rotation to the blade, a collar adapted to surround the spindle to prevent grass buildup and clumping in an area proximate the spindle predisposed to vortices and turbulence when the blades are rotated, and an opening in the downwardly directed interior opening adapted to discharge cut grass from the mower deck.

A further aspect of the present invention involves the collar being attached to the top wall and extends downward to a position adjacent the blade.

A further aspect of the present invention involves a generally circular wraparound baffle being adapted to surround each blade to form a cutting chamber.

A further aspect of the present invention involves the generally circular wraparound baffle preventing turbulence at blade intersection points, keeping air streams around one blade from disrupting air streams around another blade and keeping air streams within the mower deck pushing in the same direction.

A further aspect of the present invention involves a generally circular wraparound baffle having a throat area adapted to discharge cut grass generally toward the opening and/or any wall at an acute angle.

A further aspect of the present invention involves a mulching baffle being adapted to close off the throat area to mulch grass within the cutting chamber.

A further aspect of the present invention involves the blades rotating proximate the wraparound baffle to increase vacuum within the cutting chamber whereby grass clippings are drawn upward toward the top wall and suspended out of the way of grass being cut.

A further aspect of the present invention involves the opening being formed in one or more walls in the mower deck to discharge cut grass from one or more of the blades.

A further aspect of the present invention involves a generally circular wraparound baffle having a sloped wall portion with an arcuate shape, wherein the sloped wall portion is adapted to decrease in height from the generally circular wraparound baffle to an edge terminating on the top wall in the throat area to meter cut grass back into the turf and keep cut grass from recycling in the cutting chamber.

A further aspect of the present invention involves the sloped wall portion further comprising a curved wall portion having an arcuate shape, wherein the curved wall portion is adapted to curve inward toward the rotary blade away from the generally circular wraparound baffle to meter cut grass back into the turf and keep cut grass from recycling in the cutting.

In still another aspect of the present invention, a multiblade lawn mower is disclosed. The multiblade lawn mower includes a mower deck having a top wall, a front wall, a back wall and at least one side wall defining a downwardly directed interior opening, at least two blades disposed within the downwardly directed interior opening wherein each blade is attached to a spindle, a power source operatively connected to the spindle to impart rotation to the blade, a generally circular wraparound baffle adapted to surround each blade, wherein the generally circular wraparound baffle has a throat area, and a removable baffle adapted to close off the throat area to mulch grass within a cutting chamber disposed between the wraparound baffle and the collar.

A further aspect of the present invention involves a mulching plate being removably attached to an opening in the downwardly directed interior opening to close off the opening.

A further aspect of the present invention involves each generally circular wraparound baffle having a sloped wall portion with an arcuate shape, wherein the sloped wall portion is adapted to decrease in height gradually from the height of the wraparound baffle to an edge terminating on the top wall in the throat area to meter cut grass back into the turf and keep cut grass from recycling in the cutting chamber.

A further aspect of the present invention involves the sloped wall portion further comprising a curved wall portion having an arcuate shape, wherein the curved wall portion is adapted to curve inward toward the rotary blade away from the generally circular wraparound baffle to meter cut grass back into the turf and keep cut grass from recycling in the cutting chamber.

A further aspect of the present invention involves a collar being attached to the top wall extending downward to a position adjacent the blade, wherein the collar is adapted to surround the spindle to prevent grass buildup created by movement of the blade in a vortex area proximate the spindle.

In yet another aspect of the present invention, a multiblade lawn mower is disclosed. The multiblade lawn mower includes a power source adapted to power the multiblade lawn mower, a mower deck having a top wall, a front wall, a back wall, and at least one side wall defining a downwardly directed interior opening, at least two rotary blades disposed within the downwardly directed interior opening rotated by the power source, at least one opening in the downwardly directed interior opening adapted to discharge cut grass from the mower deck, and a generally circular wraparound baffle with a sloped wall portion adapted to form a cutting chamber around each rotary blade and a throat area to discharge cut grass from the cutting chamber. The sloped wall portion has an arcuate shape in at least two planes to meter cut grass back into the turf and keep cut grass from recycling in the cutting chamber.

A further aspect of the present invention involves the sloped wall portion being adapted to decrease in height gradually from the height of the wraparound baffle to an edge terminating on the top wall in the throat area.

A further aspect of the present invention involves the sloped wall portion having a curved wall portion adapted to curve inward toward the rotary blade away from the generally circular wraparound baffle.

A further aspect of the present invention involves air flow in the cutting chamber moving in a generally circular direction A further aspect of the present invention involves air flow in the throat area moving in a generally axial direction.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings, in which:

DETAILED DESCRIPTION OF THE PREFERRED EMBODIMENT

Figure 1:
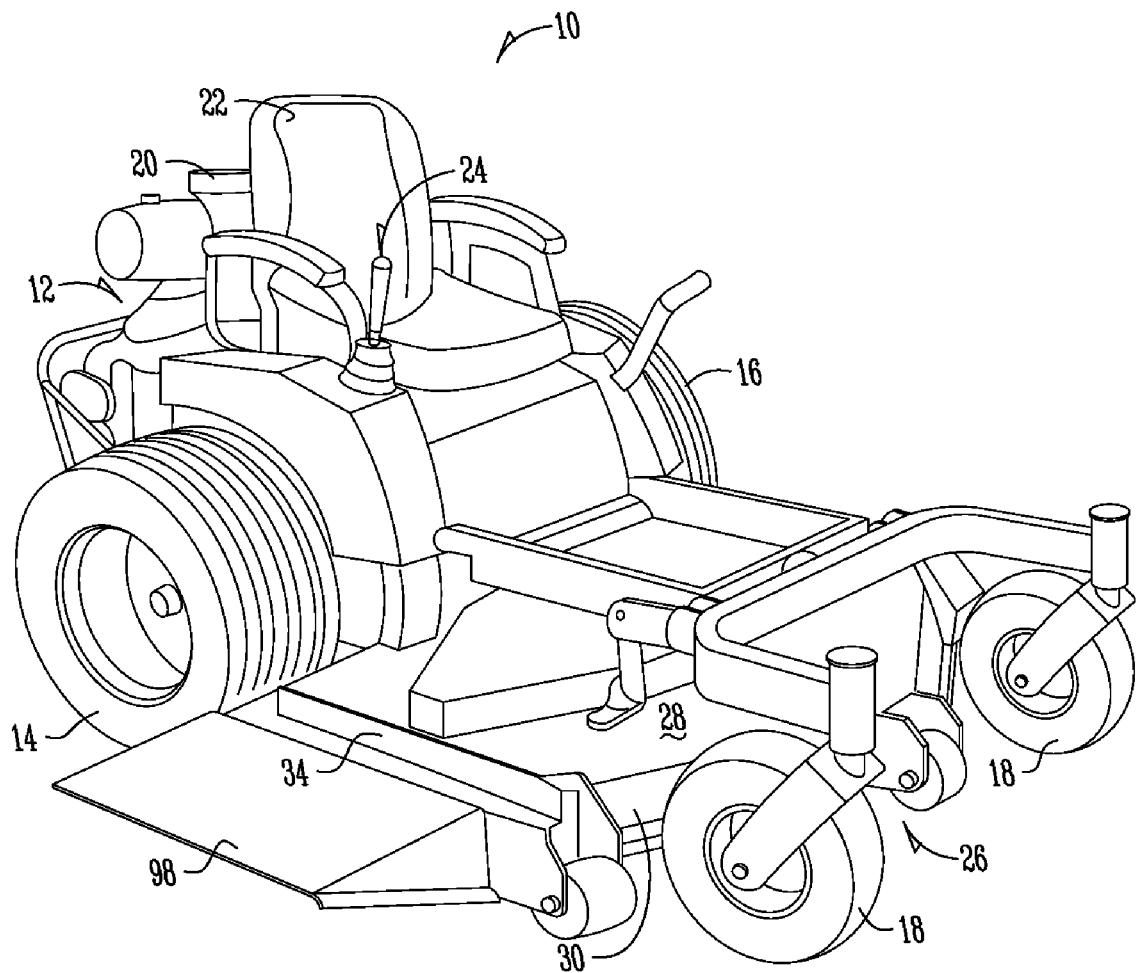
FIG. 1 is an isometric view of the multiblade lawn mower according to an exemplary embodiment of the present invention.

The numeral 10 refers to a multiblade lawn mower upon which the invention herein is mounted. Lawn mower 10 is shown to be a riding lawn mower, but it could also be a walk-behind or pull-type lawn mower. Lawn mower 10 generally includes a frame 12 having a pair of driven wheels 14 and 16 at the rear end thereof and at least one or more castor wheels 18 at the forward end thereof. Lawn mower 10 also includes a conventional power means, such as an internal combustion engine 20 for driving the wheels 14 and 16 for driving the cutting blades, as will be described hereinafter. An operator's station 22 is provided on frame 12 to accommodate an operator. Controls 24 are also provided for operating the lawn mower 10.

Mower deck 26 is mounted on the forward end of frame 12. Mower deck 26 includes a top wall 28, a front wall 30, a back wall 32, first side wall 34 and second side wall 36 defining a downwardly directed interior opening. In the embodiments shown in the drawing, first side wall 34 is provided with a discharge opening, generally referred to by the reference number 38, which may take any conventional shape. It should also be noted that the discharge opening 38 could be provided in the second side wall 36 and/or the back wall 32 if required or desired. Thus, mower deck 26 is a side discharge mower deck which will normally discharge cut grass for deposit on the ground at the right side of the lawn mower.

For the purpose of describing and orienting the various parts and components of the mower deck 26 of the present invention, the terms "upward," "up" and "decreasing in height," shall be construed or taken to mean away from the turf or toward the top wall 28 of the mower deck 26. The top wall 28 of the mower deck 26 being a reference point for describing the various part and components of the mower deck 26. Similarly, the terms "downward," "down" and "increasing in height," shall be construed or taken to mean toward the turf or away from the top wall 28 of the mower deck 26.

Figure 2:
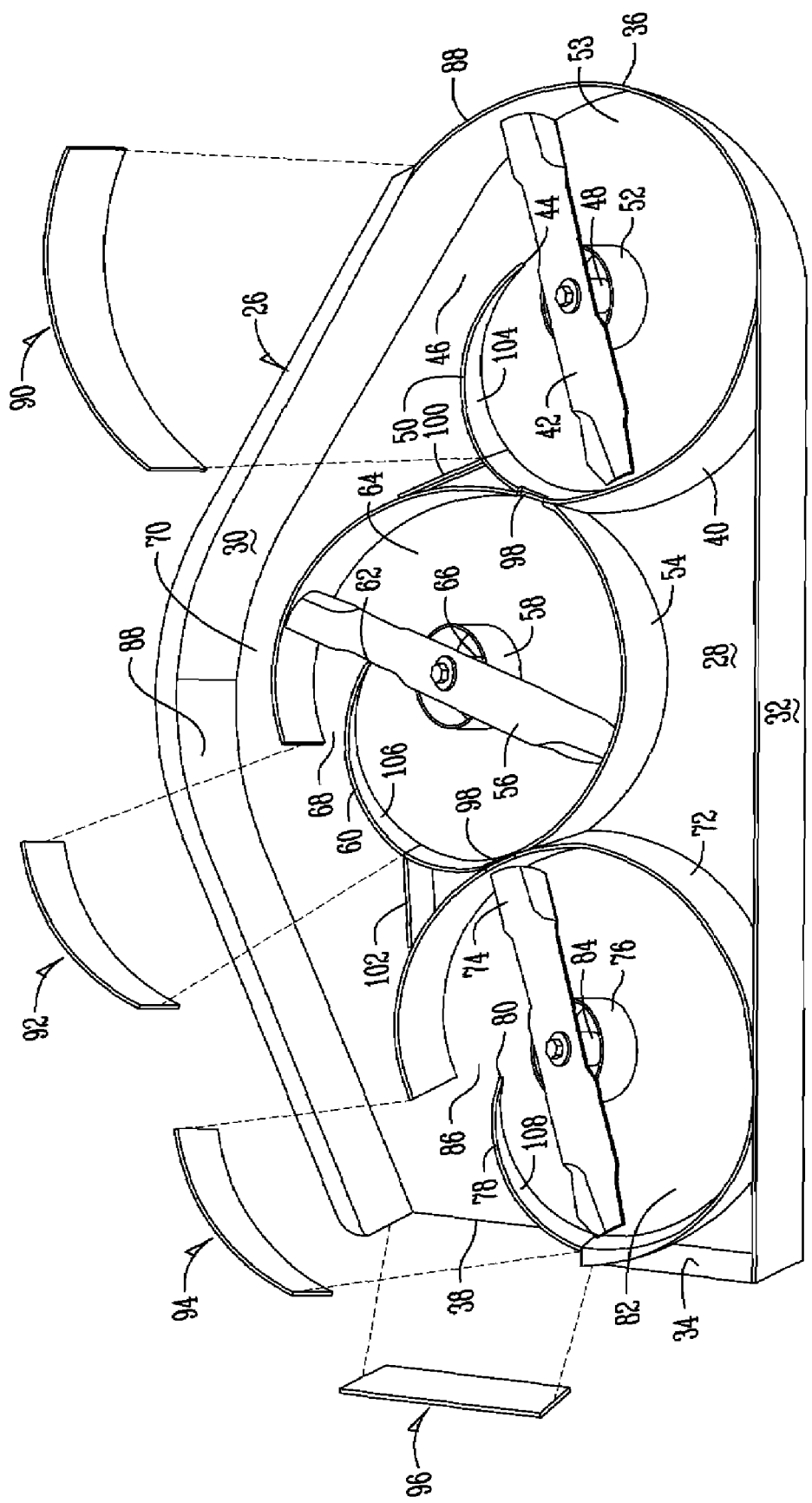
FIG. 2 is an elevation view of the underside of the mower deck in the discharge configuration according to an exemplary embodiment of the present invention.
Figure 3:
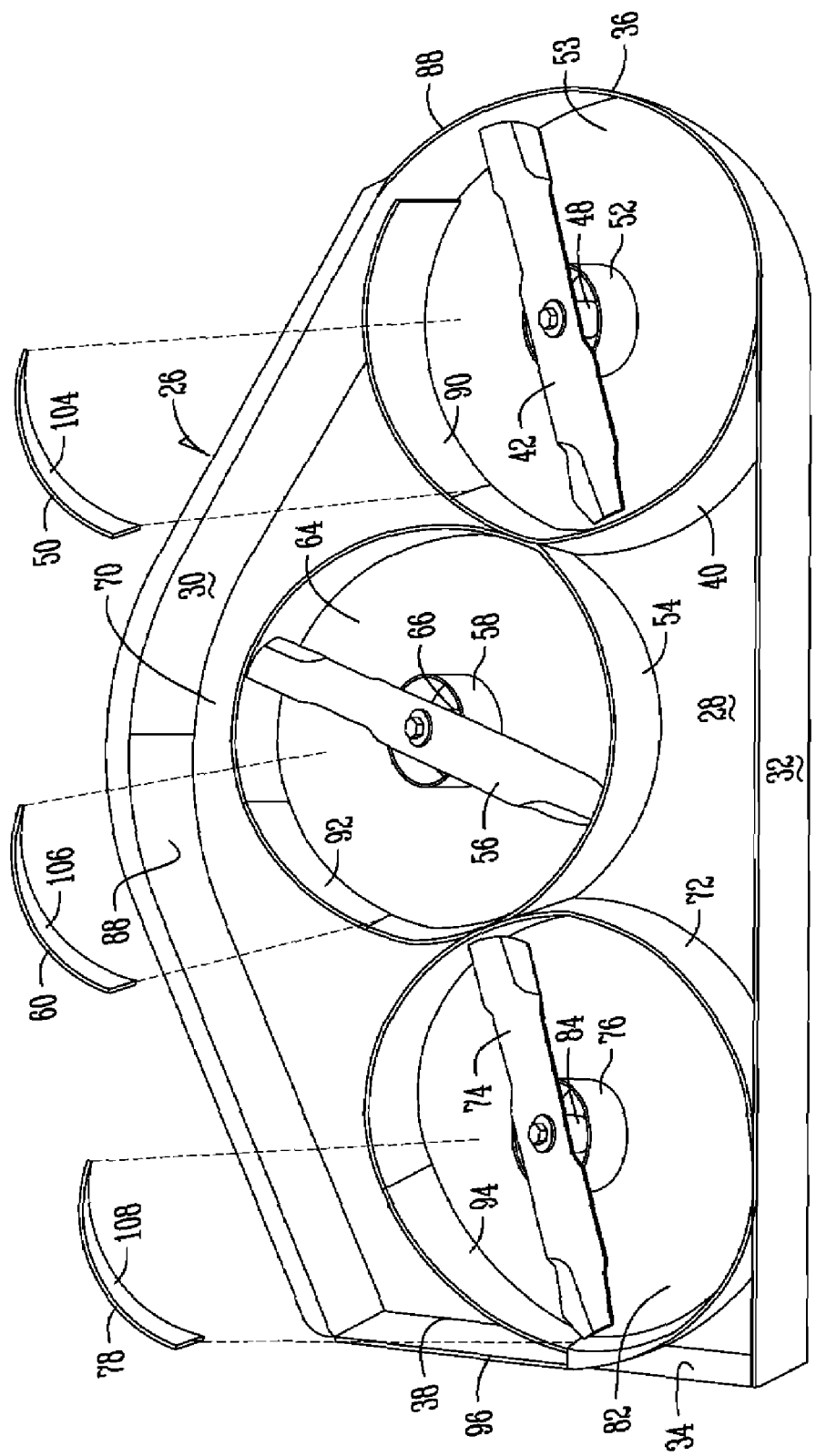
FIG. 3 is an elevation view of the underside of the mower deck in the mulching configuration according to an exemplary embodiment of the present invention.

FIGS. 2 and 3 are bottom views of the mower deck 26, and it can be seen therefrom that a first wraparound baffle 40, constructed of a suitable metal material, starts as part of the second side wall 36 of the mower deck 26, wraps around a substantial portion of blade 42, and terminates at an edge on the top wall 28 in throat area 46. First wraparound baffle 40 is preferably secured to top wall 28 of lower deck 26 by a weld, but as could be appreciated by those skilled in the art, may be attached to the top wall 28 using other fasteners, such as screws, brackets, or clamps. The first wraparound baffle 40 surrounds spindle 48 passing through top wall 28 of mower deck 26 at a radial distance equivalent to the tip of blade 42 such that as blade 42 rotates within first wraparound baffle 40, the tip of blade 42 rotates closely adjacent first wraparound baffle 40.

The sloped wall portion 50 of the first wraparound baffle 40 is arcuate in shape and decreases in height from the height of the first wraparound baffle 40 to an edge 44 approximate the top wall 28 of the mower deck 26. The sloped wall portion 50 may have an arcuate shape and be curved in two planes or have a compound curve (shown in FIG. 4), particularly curved down and inward into the throat area 46, to enhance discharge of cut grass from within first wraparound baffle 40. For example, the sloped wall portion 50 may have a curved wall portion 104 adapted to curve inward toward the rotary blade 42 away from the first wraparound baffle 40. The sloped wall portion 50 decreases in height from a height equivalent to the first wraparound baffle 40 to a point at edge 44 adjacent the top wall 28 of the mower deck 26 as it extends into the throat area 46. The sloped wall portion 50 also decreases in height at an angle which permits blade 42 to pass over top, but not impact, the sloped wall portion 50 as the sloped wall portion 50 extends into throat area 46 or the radial pathway of blade 42 when rotated.

Figure 4:
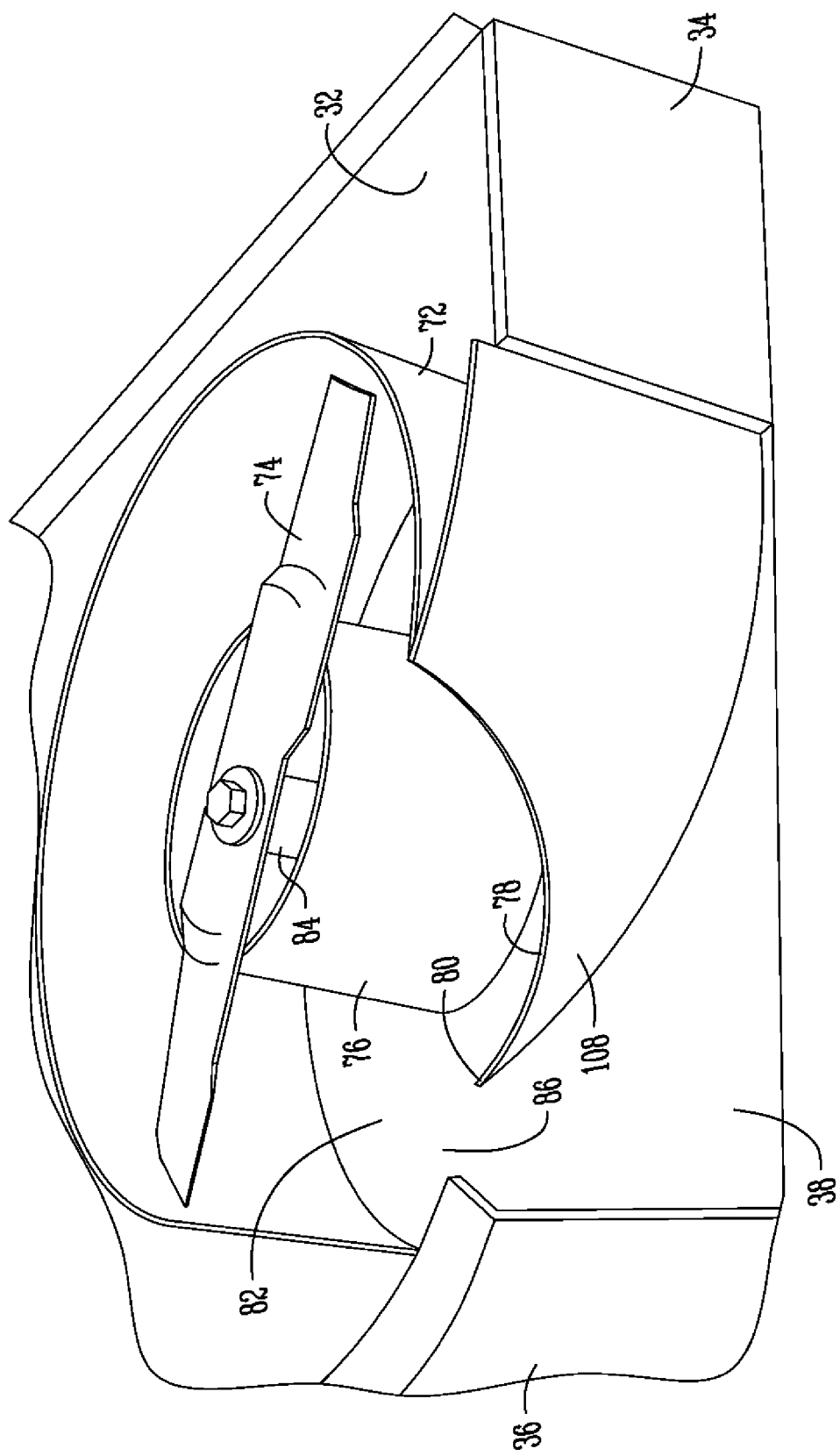
FIG. 4 is a side elevation view of the underside of the mower deck showing the collar around the spindle attached to the blade according to an exemplary embodiment of the present invention.

Situated around spindle 48 attached to blade 42 is a collar 52 that is circular in shape. The collar is preferably attached to the top wall 28 of the mower deck 26 by a weld and extends away from the top wall 28 to a position adjacent blade 42 as best illustrated in FIG. 4. Collar 52 is positioned around the spindle 48 and prevents grass clippings from occupying space around the spindle 48 which is typically predisposed to air stalling, turbulence and vortices resulting in clogging and disruption of smoother air flow streams within the first wraparound baffle 40. Thus, the resulting effect of the collar 52 and first wraparound baffle 40 is a smooth, laminar, single direction air flow stream flowing within cutting chamber 53 providing an enhanced cutting action of blade 42; suspending and separating grass clippings from grass yet to be cut; preventing buildup, clogging, and clumping; and enhancing discharge of grass clippings within the first wraparound baffle 40 out the throat area 46. Grass clippings exiting the throat area 46 of the first wraparound baffle 40 travel adjacent the front wall 30 of the mower deck 26 and are eventually discharged from mower deck 26 through opening 38 in the first side wall 34 of the mower deck 26. It should be appreciated that, although in the preferred form discharge occurs through the first side wall 34, discharge could occur through the back wall 32 or second side wall 36.

Positioned adjacent and forward of the first wraparound baffle 40, away from the back wall 32, is a second wraparound baffle 54 surrounding collar 58 housing spindle 66 attached to blade 56. Positioned in a similar longitudinal plane as the first wraparound baffle 40 near the first side wall 34 and back wall 32 is a third wraparound baffle 72. Similar to the first wraparound baffle 40, the second wraparound baffle 54 and third wraparound baffle 72 have a sloped wall portion 60, 78 decreasing in height from the height of respective wraparound baffles 54, 72 to an edge 62, 80 adjacent and on the top wall 28 of the mower deck 26. In the preferred embodiment, the second wraparound baffle 54 is positioned inside the mower deck 26 sufficiently away from front wall 30 toward back wall 32 so as to leave a chute 70 between the outer wall of the second wraparound baffle 54 and the front wall 30 of the mower deck 26. Thus, cut grass discharges from first wraparound baffle 40, travels out the throat area 46 and along chute 70 between the outer side walls of the first wraparound baffle 40, second wraparound baffle 54, and third wraparound baffle 72, and the front wall 30 of the mower deck 26, out opening 38. Similar to the first wraparound baffle 40, the second and third wraparound baffles 54, 72 are spaced at a circumferential radius away from the spindle 66, 84 attached to blade 56, 74 equivalent to the radius of blade 56, 74 so that blade 56, 74 rotates adjacent the wraparound baffles 54, 72 to enhance the vacuum generated by the blade 56, 74 within the wraparound baffles 54, 72.

A cutting chamber 64, 82 is defined by the area between the outer circumference of collar 58, 76 and the inner circumference of the wraparound baffles 54, 72. Flowing from cutting chambers 64, 82 between sloped wall portions 60, 78 and wraparound baffles 54, 72 in throat areas 68, 86. Cut grass from wraparound baffles 54, 72 exits throat areas 68, 86 into chute 70. Cut grass from the second wraparound baffle 54 exits throat area 68, hits front wall 30 at an acute angle to prevent stalling of air flows, buildup and clogging of grass clippings through the chute 70 and out opening 38. Similarly, cut grass from the third wraparound baffle 72 discharges through throat area 86 out opening 38. Thus, cut grass from wraparound baffles 40, 54 and 72 moves and exits through their respective throat areas 46, 68 and 86 into chute 70 and out opening 38 in a smooth, laminar, unidirectional manner such that the air flow from each wraparound baffle 40, 54 and 72 pushes in the same general direction toward opening 38 in the mower deck 26. The wraparound baffles 40, 54, and 72 and the sloped wall portions 50, 60 and 78 with curved wall portions 104, 106 and 108 are designed so air flow in the cutting chambers 53, 64, and 82 moves in a generally circular direction and air flow in the throat areas 46, 68 and 86 moves in a generally axial direction. Although the respective throat areas 46, 68 and 86 are shown as discharging cut grass through one opening it should be appreciated that mower deck 26 could have multiple throats for discharging cut grass through multiple discharge points or a single discharge point in multiple or single openings within one wall or multiple walls of the mower deck 26.

In the preferred embodiment, the height of both the wraparound baffles 40, 54 and 72 extend away from the top wall 28 beyond the height of respective blades 42, 56 and 74 which they surround. Because wraparound baffles 40, 54 and 72 extend beyond the height of blades 42, 56 and 74, blades 42, 56 and 74 are able to pass by each other without creating a high turbulence area where the three blades 42, 56 and 74 cross in their respective rotational paths. A notched area 98 in each respective wraparound baffle 40, 54 and 72 may be used to permit blades to rotate within very close distances of one another without actually touching each other or wraparound baffles 40, 54 and 72. The notched area 98 is small enough to not disturb the overall effect of the wraparound baffle, namely, preventing high turbulence areas at blade intersection points, enhancing the flow of cut grass out of cutting chambers 53, 64 and 82 and each respective throat area 46, 68 and 86. Preventing high turbulence reduces buildup, clumping and clogging of grass clippings within cutting chambers 53, 64, and 82; creates smooth, laminar, unidirectional air flow streams within cutting chambers 53, 64, and 82; and enhances the vacuum produced by respective blades 42, 56 and 74. In addition to the benefits that result from rotating blades 42, 56 and 74 within respective wraparound baffles 40, 54 and 72; sloped wall portions 50, 60 and 78 help prevent cut grass from recycling within cutting chambers 53, 64, and 82 and meter cut grass back into the turf, generate a greater vacuum and unidirectional flow of cut grass by completing the wraparound effect of respective baffles 40, 54 and 72 yet still permit cut grass to be discharged through the respective throat areas 46, 68 and 86 into chute 70 and out opening 38 in the mower deck 26. Furthermore, collars 52, 58 and 76 surrounding respective spindles 48, 66 and 84 attached to respective blades 42, 56 and 74 5 enhance the unidirectional, laminar flow of grass clippings around cutting chambers 53, 64 and 82 and out throat areas 46, 68 and 86, which reduces chances of air flow stalling within cutting chambers 53, 64 and 82 and the potential for clogging and buildup of grass clippings providing a better overall flow of grass clippings within cutting chambers 53, 64 and 82 and out respective throat areas 46, 68 and 86.

Cut grass circulating within cutting chambers 53, 64 and 82 near the top wall 28 (as a result of the vacuum generated by respective blades 42, 56 and 74) is discharged through throat areas 46, 68 and 86. The height of sloped wall portions 50, 60 and 78 are minimal within the throat areas 46, 68 and 86. The sloped wall portions 50, 60 and 78 are designed to direct cut grass out their respective throat areas 46, 68 and 86, to prevent recycling of cut 15 grass within the respective cutting chambers 53, 64 and 82 and to insure laminar, unidirectional flow and vacuum is preserved within the wraparound baffles 40, 54 and 72.

In other words, the wraparound baffles 40, 54 and 72 in combination with sloped wall portions 50, 60 and 78 keep cut grass out of the area of uncut grass within respective cutting chambers 53, 64, and 82. For example, when grass is cut it is drafted upward 20 toward the top wall 28, meets sloped wall portions 50, 60 and 78 when rotating in cutting chamber 53, 64, and 82, and exits through throat areas 46, 68 and 86 so that cut grass is not recycled through cutting chamber 53, 64, and 82. In the preferred form, sloped wall portions 50, 60 and 78 curve inward away from wraparound baffles 40, 54 and 72 toward spindle 48, 66 and 84 within throat area 46, 68 and 86 so as to meter cut grass back into the 25 turf and prevent cut grass from recycling in cutting chamber 53, 64, and 82. The sloped wall portions 50, 60 and 78 are also designed so that each sloped wall portion 50, 60 and 78 decreases in height from the height of the wraparound baffles 40, 54 and 72 as it enters into the respective throat areas 46, 68 and 86. The sloped wall portions 50, 60 and 78 are also designed so that air flow within cutting chamber 53, 64, and 82 impinges each sloped 30 wall portion 50, 60 and 78 at an acute angle to prevent air stalling, turbulence and vortices.

A filler baffle 100, 102 may be positioned between wraparound baffles 40, 54 and 72 to eliminate crevices, cracks or corners in the mower deck 26 predisposed to buildup of clippings or causing non-laminar air flows within the mower deck 26. Filler baffles 100, 102 and sloped wall portions 50, 60 may be formed as a unitary piece or two separate pieces. As a unitary piece, filler baffles 100, 102 would be removed and inserted simultaneously with the removal and insertion of sloped wall portions 50, 60.

In addition to the other features of the mower deck 26, mower deck 26 has curved surfaces 88 in the second side wall 36 and the front wall 30 to enhance the throughput of cut grass through chute 70 and out opening 38, reduce stalling of air flows within the chute area 70 and the potential for buildup, clogging, clumping of grass clippings within the chute area 70 as a result of non-unidirectional or stalling air flows. The curved surfaces of the sloped wall portions 50, 60 and 78 also prevents grass from building up on or sticking to the sloped wall portions 50, 60 and 78.

FIGS. 2 and 3 illustrate the removable mulching baffles of the present invention which are referenced by numerals 90, 92 and 94 respectively. First, second, and third mulching baffles 90, 92, and 94 are generally arcuate shaped and have the same identical height as first, second and third wraparound baffles 40, 54, and 72. The mulching baffles 90, 92, and 94 are constructed of a suitable metal material and positioned within respective throat areas 46, 68, and 86 to prevent the flow of grass clippings out of cutting chambers 53, 64, and 82. Each mulching baffle 90, 92, and 94 is adapted to quickly connect and disconnect within throat areas 46, 68, and 86. For example, mulching baffles 90, 92, and 94 could be fitted into a groove having the same width as the thickness of each baffle 90, 92, and 94 and secured to wraparound baffle 40, 54, and 72 by a quick fastener, such as a hitch pin, screw, latch, or otherwise. When the mower deck 26 is converted to a mulching deck, sloped wall portions 50, 60, and 78 are swapped out for respective mulching baffles 90, 92, and 94. Sloped wall portions 50, 60, and 78 may be connected to wraparound baffles 40, 54, and 72 in the same manner in which mulching baffles 90, 92, and 94 are attached to mower deck 26. For example, sloped wall portions 50, 60 and 78 could be received within a recessed channel within the top wall 28 of the mower deck 26 and snapped connected, hinge connected, or pin connected to respective wraparound baffles 40, 54, and 72 so as not to disturb the unidirectional, laminar flow of grass clippings within cutting chambers 53, 64 and 82 by some abutment or projection that is predisposed to causing vortices or turbulence within cutting chambers 53, 64 and 82. Mulching baffles 90, 92 and 94 are attached to the respective wraparound baffles 40, 54, and 72 to close of throat areas 46, 68 and 86 so blades 42, 56 and 74 rotate within a fully-enclosed environment. Blades 42, 56, and 74 rotate closely adjacent respective wraparound baffles 40, 54, and 72 at their outer ends thereby resulting in a high vacuum within respective cutting chambers 53, 64, and 82. Blades 42, 56, and 74 may be mulching blades specially designed for mulching. Additionally, collars 52, 58, and 76, in combination with the full wraparound effect of baffles 40 & 90, 54 & 92, and 72 & 94 prevent non-unidirectional flows of grass clippings, vortices, clumping, buildup, and/or clogging as cut grass clippings are suspended above respective blades 42, 56, and 74 near the top wall 28 of the mower deck 26 so as to not interfere with grass cutting. The full wraparound effect of baffles 40 & 90, 54 & 92, and 72 & 94 also prevents cur grass from being passed from one cutting chamber to another. This means that a single cutting chamber would not be doing the mulching work on cut grass from another cutting chamber or blade. The combination of collars 52, 58 and 76 with the full wraparound effect of baffles 40 & 90, 54 & 92, and 72 & 94 enhances the mulching process by providing precision cutting and reintroduction of mulch into the lawn. In one optional embodiment of the mulching configuration, a mulching plate 96 may be attached to the first side wall 34 of the mower deck 26 to close off opening 38. Alternatively, in the discharge configuration, a discharge baffle 98 may be attached to the first side wall 34 or another side wall of the mower deck 26 so as to further direct grass clippings out away from the mower deck 26 (as shown in FIG. 1).

In this manner, it can be seen that the mower deck 26 of the present invention allows a user to either operate the mower deck 26 in a discharge configuration or a mulching configuration by either inserting sloped wall portions 50, 60, and 78 or replacing sloped wall portions 50, 60, and 78 with respective mulching baffles 90, 92, and 94.

A preferred embodiment of the present invention has been set forth above. It should be understood by one of ordinary skill in the art that modifications may be made in detail, especially in matters of shape, size, and arrangement of parts. Such modifications are deemed to be within the scope of the present invention, which is to be limited only by the broad general meaning of the terms in which the appended claims are expressed.

What is claimed is:

1. A multiblade lawn mower, comprising:
    a mower deck having a top wall, a front wall, a back wall, and at least one side wall defining a downwardly directed interior opening;
    at least two rotary blades disposed within the downwardly directed interior opening;
    at least one opening in a wall defining the downwardly directed interior opening adapted to discharge cut grass from the mower deck;
    a generally circular wraparound baffle adapted to surround each rotary blade and form an independent cutting chamber which does not communicate with any other cutting chamber, wherein each generally circular wraparound baffle has a throat area positioned to direct air flow in a common direction wherein each generally circular wraparound baffle has a sloped wall portion having an arcuate shape, wherein the sloped wall portion is adapted to decrease in height gradually from the height of the generally circular wraparound baffle to an edge terminating on the top wall in the throat area to meter cut grass back into the turf and keep cut grass from recycling in the cutting chamber;
    said sloped wall portion having a curved wall portion having an arcuate shape, wherein the curved wall portion is adapted to curve inward toward the rotary blade away from the generally circular wraparound baffle to meter cut grass back into the turf and keep cut grass from recycling in the cutting chamber; and
    a power source operatively connected to the rotary blades to impart rotation to each of the rotary blades.

2. The multiblade lawn mower of claim 1 wherein the generally circular wraparound baffle is further adapted to discharge cut grass generally toward the at least one opening.

3. The multiblade lawn mower of claim 1 wherein a collar attached to the top wall extending downward to a position adjacent the rotary blade is adapted to surround a spindle attached to the rotary blade to prevent grass buildup created by movement of the rotary blade in a vortex area proximate the spindle.

4. The multiblade lawn mower of claim 1 wherein a removable baffle is adapted to close off the throat area associated with each generally circular wraparound baffle to mulch cut grass.

5. The multiblade lawn mower of claim 4 wherein a mulching plate may be removably attached to the opening in the downwardly directed interior opening.

6. The multiblade lawn mower of claim 1 wherein the generally circular wraparound baffle prevents turbulence at blade intersection points, keeps air streams around one blade from disrupting air streams around another blade and keeps air streams within the mower deck pushing in the same direction.

7. The multiblade lawn mower of claim 1 wherein a mulching baffle is adapted to close off the throat area to mulch grass within the cutting chamber.

8. The multiblade lawn mower of claim 7 wherein the blade rotates proximate the wraparound baffle to increase vacuum within the cutting chamber whereby grass clippings are drawn upward toward the top wall and suspended out of the way of grass being cut.

9. The multiblade lawn mower of claim 1 wherein the opening is formed in one or more walls in the mower deck to discharge cut grass from one or more of the blades.

10. The multiblade lawn mower of claim 1 wherein the generally circular wraparound baffle is further adapted to discharge cut grass toward any wall at an acute angle.

11. A multiblade lawn mower, comprising:
   a mower deck having a top wall, a front wall, a back wall and at least one side wall defining a downwardly directed interior opening;
   at least two blades disposed within the downwardly directed interior opening wherein each blade is attached to a spindle;
   a power source operatively connected to the spindle to impart rotation to the blade;
   a generally circular wraparound baffle adapted to surround each blade and form an independent cutting chamber for each, wherein the generally circular wraparound baffle has a throat area positioned to direct air flow from each baffle in a common direction wherein each generally circular wraparound baffle has a sloped wall portion having an arcuate shape, wherein the sloped wall portion is adapted to decrease in height gradually from the height of the wraparound baffle to an edge terminating on the top wall in the throat area to meter cut grass back into the turf and keen cut grass from recycling in the cutting chamber;
   said sloped wall portion further comprises a curved wall portion having an arcuate shape, wherein the curved wall portion is adapted to curve inward toward the rotary blade away from the generally circular wraparound baffle to meter cut grass back into the turf and keep cut grass from recycling in the cutting chamber; and
   a removable baffle adapted to close off the throat area to mulch grass within a cutting chamber disposed between the wraparound baffle and a collar.

12. The multiblade lawn mower of claim 11 wherein a mulching plate may be removably attached to an opening in the downwardly directed interior opening to close off the opening.

13. The multiblade lawn mower of claim 11 further comprising a collar attached to the top wall extending downward to a position adjacent the blade, wherein the collar is adapted to surround the spindle to prevent grass buildup created by movement of the blade in a vortex area proximate the spindle.

* * * * *